（12）United States Patent
King et al.

(10) Patent No.: US 7,877,523 B2
(45) Date of Patent: *Jan. 25, 2011

(54) APPARATUS, COMPUTER PROGRAM PRODUCT, AND SYSTEM FOR COMPLETING A PLURALITY OF CHAINED LIST DMA COMMANDS THAT INCLUDE A FENCED LIST DMA COMMAND ELEMENT

(75) Inventors: Matthew Edward King, Pflugerville, TX (US); Peichum Peter Liu, Austin, TX (US); David Mui, Round Rock, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/331,733

(22) Filed: Dec. 10, 2008

(65) Prior Publication Data

US 2009/0094388 A1    Apr. 9, 2009

Related U.S. Application Data

(63) Continuation of application No. 10/631,541, filed on Jul. 31, 2003, now Pat. No. 7,512,722.

(51) Int. Cl.
G06F 3/00 (2006.01)
G06F 13/00 (2006.01)
(52) U.S. Cl. ............................ 710/24; 710/22; 718/104
(58) Field of Classification Search ................... 710/22, 710/24; 718/104
See application file for complete search history.

(56) References Cited

U.S. PATENT DOCUMENTS

| 6,269,458 | B1 * | 7/2001 | Jeter et al. ..................... 714/42 |
| 6,691,178 | B1 * | 2/2004 | Kasper ........................ 710/22 |
| 2004/0015617 | A1 | 1/2004 | Sangha et al. |
| 2004/0187135 | A1 * | 9/2004 | Pronovost et al. ........... 718/104 |
| 2004/0210693 | A1 | 10/2004 | Zeitler et al. |
| 2004/0243739 | A1 * | 12/2004 | Spencer ....................... 710/22 |

* cited by examiner

*Primary Examiner*—Alford W Kindred
*Assistant Examiner*—Farley J Abad
(74) *Attorney, Agent, or Firm*—Matthew Talpis

(57) ABSTRACT

An apparatus and a computer program product are provided for completing a plurality of (direct memory access) DMA commands in a computer system. It is determined whether the DMA commands are chained together as a list DMA command. Upon a determination that the DMA commands are chained together as a list DMA command, it is also determined whether a current list element of the list DMA command is fenced. Upon a determination that the current list element is not fenced, a next list element is fetched and processed before the current list element has been completed.

33 Claims, 3 Drawing Sheets

US 7,877,523 B2

APPARATUS, COMPUTER PROGRAM PRODUCT, AND SYSTEM FOR COMPLETING A PLURALITY OF CHAINED LIST DMA COMMANDS THAT INCLUDE A FENCED LIST DMA COMMAND ELEMENT

CROSS-REFERENCE TO RELATED APPLICATIONS

This application is a continuation of, and claims the benefit of the filing date of, U.S. patent application Ser. No. 10/631,541 entitled "Method for completing a plurality of chained list DMA commands that include a fenced list DMA command element" filed Jul. 31, 2003 now U.S. Pat. No. 7,512,722.

BACKGROUND OF THE INVENTION

1. Field of the Invention

The invention relates generally to a computer system and, more particularly, to handling and completing direct memory access (DMA) commands.

2. Description of the Related Art

There are many methods to complete direct memory access (DMA) commands. Perhaps the simplest method is to have a counter that tracks the transfer size. When the size is zero, the DMA command can be completed. For complex DMA transfers, however, this method may not work well. For example, some DMA transfers should be completed before subsequent DMA transfers are initiated. Other DMA transfers do not have to be completed before subsequent DMA transfers are initiated.

Therefore, a need exists for reducing the latency in completing a DMA task, by optimizing the DMA transfers depending on the type of DMA commands.

SUMMARY OF THE INVENTION

The present invention provides a method, an apparatus, and a computer program product for completing a plurality of (direct memory access) DMA commands in a computer system. It is determined whether the DMA commands are chained together as a list DMA command. Upon a determination that the DMA commands are chained together as a list DMA command, it is also determined whether a current list element of the list DMA command is fenced. Upon a determination that the current list element is not fenced, a next list element is fetched and processed before the current list element has been completed.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
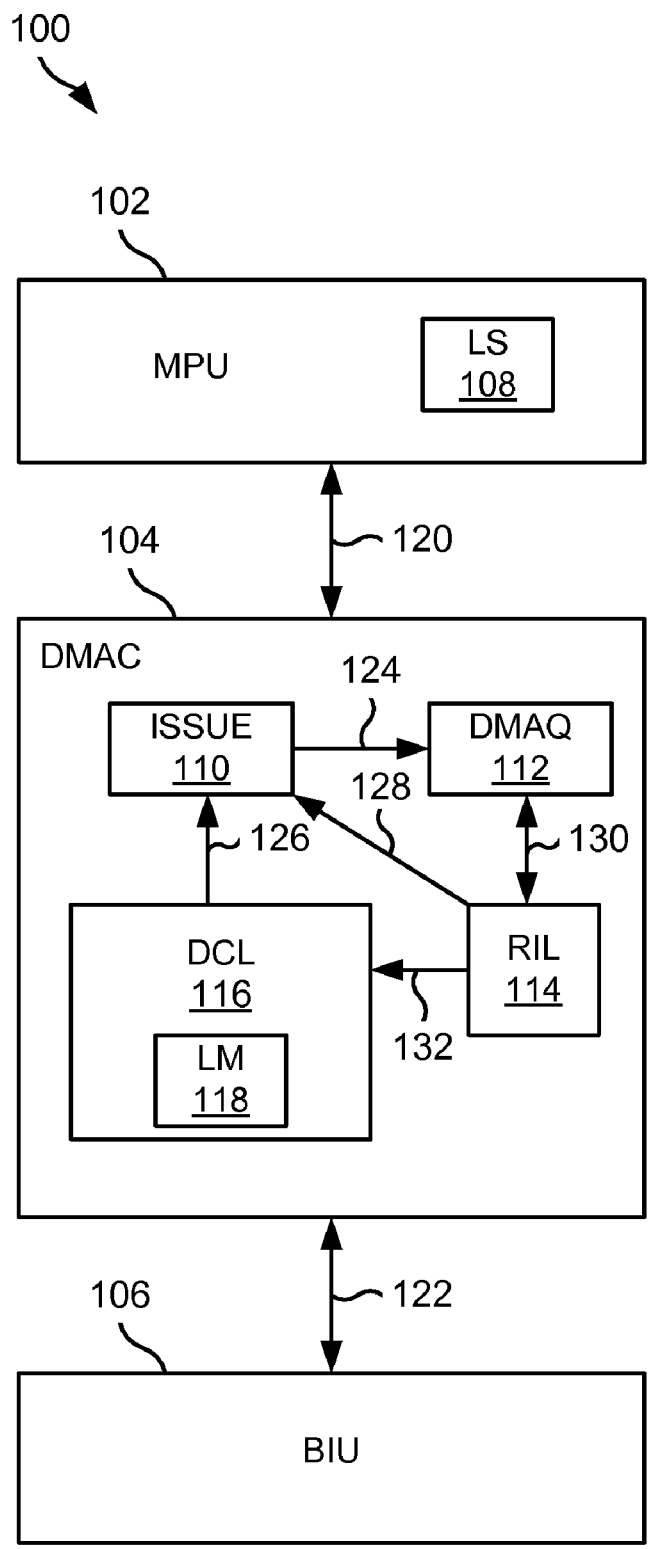
FIG. 1 depicts a block diagram illustrating a direct memory access (DMA) completion mechanism in a computer system having a main processing unit (MPU)

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless indicated otherwise.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

For a complex direct memory access (DMA) transfer, a plurality of DMA commands can be chained together as a single DMA command called a "list DMA command." Each of the DMA commands contained in a list DMA command is called a list element. A list DMA command may contain a pointer to a first list element included in the list DMA command. The list elements in the list DMA command may be fenced or non-fenced. If the list element is fenced, then it must be completed by a bus before the next list element can be fetched and proceed.

However, at times, it is desirable to proceed to the next list element before the current list element has been completed (i.e., a bus that takes care of the list element has returned data requested to be fetched in the list element) if the current list element is not fenced. In this case, after the current list element has finished "unrolling" one or more requests to the bus, the DMA engine can start processing the next list element before the current list element is completed on the bus. Since the latencies on the bus vary depending on the workload type, it is possible that the completion of the current list element can take a long time.

Now referring to FIG. 1 of the drawings, the reference numeral 100 generally designates a block diagram illustrating a portion of a computer system related to DMA transfers. The block diagram 100 comprises a main processing unit (MPU) 102, a direct memory access controller (DMAC) 104, and a bus interface unit 106. The MPU 102 includes a local storage 108 such as a level 1 (L1) cache. The DMAC 104 includes an issue logic 110, a DMA command queue (DMAQ) 112, a request interface logic (RIL) 11, and a DMA completion logic (DCL) 13. The DMA completion logic includes a local memory (LM) 118 such as a register file. The MPU 102 is coupled to the DMAC 104 via a connection 120. The DMAC 104 is coupled to the bus interface unit 106 via a connection 122. Specifically, the issue logic 110 is coupled to the DMAQ 112, the DCL 13, and the RIL 11 via connections 124, 126, and 128, respectively. The RIL 11 is coupled to the DMAQ 112 and the DCL 13 via connections 117 and 132, respectively.

The DCL 13 contains information as to whether the current list element is fenced. Preferably, this information is stored in the LM 118 and stores a table including indications of completion count, list, stall/fence, and finish. The issue logic 110 is configured for issuing a DMA unroll request and is coupled to the DCL 13 for receiving a stall notification from the DCL 13. The DMA command queue (DMAQ) is configured for temporarily storing the DMA command and is coupled to the issue logic 110 for receiving the DMA unroll request. The request interface logic (RIL) 11 is coupled to the DMAQ, the issue logic, and the DCL. The RIL is configured for processing at least one segment of the DMA command.

The MPU 102 generates a DMA command, which is transferred to the DMAC 104 via the connection 120. The transferred DMA command is temporarily held at the DMAQ 112. Preferably, the DMA command is initially stored in the local storage 108, and the MPU 102 is configured for sending a control signal to the DMAC 104 to inform the DMAC 104 that the DMA command is available from the local storage 108. Such a control signal may also include information as to the properties of the DMA command. The information may include, for example, the type of the DMA command (e.g., whether the DMA command is a list DMA command and, if so, whether list elements in the list DMA command are fenced or not fenced).

The DMA command is preferably fetched by the issue logic 110. Based on the information received from the MPU 102, the issue logic 110 fetches the DMA command from the local storage 108 and places the DMA command in the DMAQ 112. The DMAQ 112 temporarily holds multiple DMA commands (or multiple list elements in the case of multiple list DMA commands) before they are sent out to the bus interface unit 106. Preferably, the request interface logic 11 accesses the DMAQ 112 to retrieve a DMA command (or a list element in the case of a list DMA command) from the DMAQ 112. This retrieved DMA command is then provided to the bus interface unit 106 via the connection 122. As mentioned above, this process involves "unrolling" one or more requests to the bus interface unit 106.

In the case of a list DMA command, the DCL 13 determines when the DMAC 104 can start processing the next list DMA command in the DMAQ 112. If list elements of the list DMA command are fenced, then the DMAC 104 has to wait for the prior list DMA command to be completed, for example, on a bus (not shown). If the list elements are not fenced, the DMAC 104 does not have to wait for the prior DMA list element to be completed before starting to process the next list element. The LM 118 is configured to store information used to determine whether the DMAC 104 should wait for the prior DMA list element to be completed before starting to process the next list element.

Such information includes, but may not be limited to, (a) the status of a DMA command already sent to the bus interface unit, (b) the properties of a DMA command (e.g., whether it is a list DMA command, and if so, whether the list elements of the list DMA command are fenced or not fenced), and (c) an indication of the last request of a DMA command being issued to the bus. Preferably, the LM 118 is configured to store a table that contains the following bits for the DMAQ 112: one or more completion count bits, a list bit, a stall/fence bit, and a finish bit.

The number of completion count bits is dependent on the size of a buffer (not shown) in the bus interface unit 106. This value is incremented when requests are issued to the bus and decremented when the bus completes a request. For instance, if the number of queue entries is 3, then the completion count is 5 bits.

The list bit is set if the command that is queued is a list DMA command. This bit is reset when the last transfer/unroll of the last list element has been issued to the bus. For example, if the size of the list DMA command is five (i.e., there are five list elements in the list DMA command), the list bit is set when the command is queued and reset on the last transfer to the bus of the fifth list element.

The stall/fence bit is set if the current list element is fenced. When this bit is set, the list element must wait for all bus completions to take place, send a stall notification condition and wait for the stall acknowledgement before the next list element can be processed. This bit is reset when the current list element with fenced/stall condition is acknowledged by the MPU 102.

The finish bit is set when the last unroll/request for the current DMA command has been issued to the bus. In the case of a list DMA command, this bit is set when the last unroll or request for the list element has been issued. This bit is reset when a new command is enqueued into the DMA queue entry, when a stall notification has been sent, or when a new list element is fetched.

When a list element is fetched and enqueued, the list bit and stall/fence bit in the DCL 13 are updated. For non-list DMA commands, these fields are always zero. When a DMA request is issued out to the bus, the completion count in the completion logic is incremented by one. Later, the bus will provide a completion for that DMA request, and the completion logic will decrement the completion count by one. On the last request of the current DMA command (or last list element), the finish bit in the DCL 13 will be set.

Figure 2:
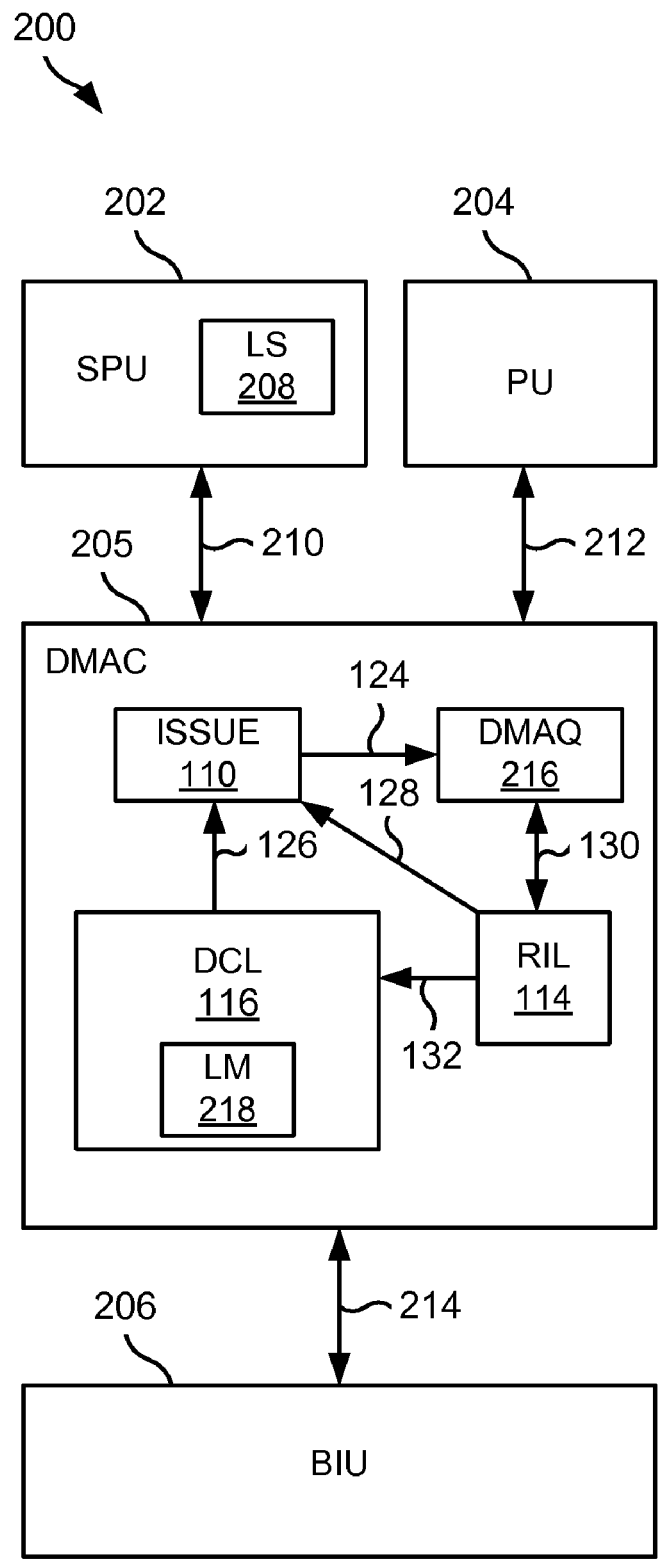
FIG. 2 depicts a block diagram illustrating a DMA completion mechanism in a computer system having two or more processing units.

Now referring to FIG. 2, a block diagram 200 shows a portion of a computer system, where there exist two processors, namely, a synergistic processing unit (SPU) 202 and a processing unit (PU) 204. The computer system also has a DMAC 205 and a bus interface unit (BIU) 206. The SPU 202 includes a local storage 208 for storing a plurality of DMA commands. The SPU 202 is coupled to the DMAC 205 via a connection 210. Similarly, the PU 204 is coupled to the DMAC 205 via a connection 212. The DMAC 205 is coupled to the BIU 206 via a connection 21. The DMAC 205 is similar to the DMAC 104 of FIG. 1, except that the DMAC 205 has a DMAQ 23 and an LM 218 instead of the DMAQ 112 and the LM 118 of FIG. 1. The DMAQ 23 is configured to house DMA commands sourced from both the SPU 202 and the PU 204. The LM 218 is configured to store first and second tables (not shown) corresponding to the SPU 202 and the PU 204, respectively.

Preferably, the LM 218 is configured to store a table that contains the following bits for the DMAQ 23: one or more completion count bits, a list bit, a stall/fence bit, and a finish bit. The properties of these bits are as illustrated above in reference to FIG. 1.

Similarly, the LM 218 is also configured to store the second table that contains the following bits for the DMAQ 23: one or more completion count bits, a start bit, and a finish bit. The start bit is sent to start the SPU 202 after the DMA command has been completed. This bit is set when the command is enqueued. There is no requirement to reset this bit since every time a DMA command is enqueued, the value of this bit will be written with a new value.

It is noted here that the present invention may be implemented in a computer system further including additional processor(s) in a similar fashion without departing from the spirit of the present invention.

Figure 3:
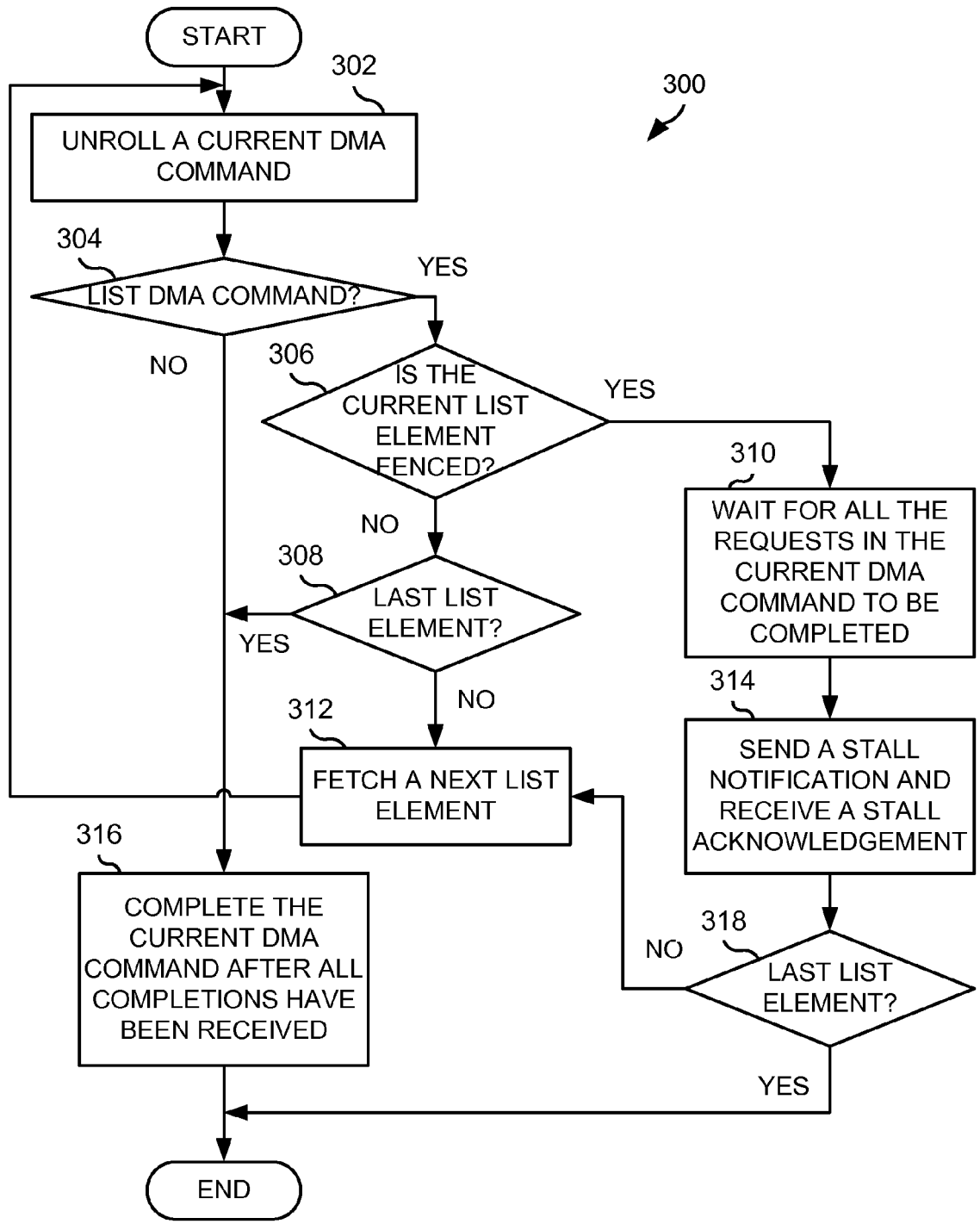
FIG. 3 depicts a flow diagram illustrating a DMA completion mechanism.

In FIG. 3, a flow diagram 170 is shown to illustrate a DMA completion mechanism. In step 172, a current DMA command is unrolled. The process of unrolling the current DMA command includes generating one or more requests from the current DMA command and sending the requests to a bus, for example, through the BIU 206 of FIG. 2. Preferably, a DMA command may include up to 128 requests, each of which may be of the size of a cache line. The process of unrolling in step 172 is complete when all the requests arising out of the current DMA command are sent to the bus.

In step 174, it is determined whether the current DMA command is a list element of a list DMA command. If the current DMA command is a list element of a list DMA command, which list element is now considered a current list element, it is further determined in step 176 whether the current list element is fenced.

If the current list element is not fenced, the process goes to step 178 to determine whether the current list element is the last list element of the list DMA command. If on the other hand the current list element is fenced, the process goes to step 310 to wait for all the requests in the current DMA command to be completed. When the last request for the last list element has been sent to the bus, the list bit will be reset to '0'. The completion of the list DMA command occurs when completion count=0, finish=1, and stall/fence=0. If the current list element is fenced, the DMAC will wait until the completion count =0 (stall/fence=1, finish=1) and notify a processor (e.g., the MPU 102 of FIG. 1 or the SPU 202 of FIG. 2) that the current list element is stalled. The finish bit is reset after the notification of the list element. The stall/fence bit does not need to be reset since the next list element will write in a new value.

If it is determined in step 178 that the current list element is not the last list element of the list DMA command, then the process goes to step 312 to fetch a next list element and then returns to step 172. Preferably after step 310, a stall notification is sent and a stall acknowledgement is received in step 31. In reference to FIG. 1, for example, the DMAC 104 sends the stall notification to the MPU 102 and receives the stall acknowledgement from the MPU 102. Alternatively, step 31 may come before step 310 depending on the detailed implementation of a specific DMA completion mechanism.

If it is determined in step 178 that the current list element is the last list element of the list DMA command, the process goes to step 33 to complete the current DMA command after all completions have been received. Subsequently, the process ends. For list DMA commands, when the last transfer of the list element is issued to the bus, the finish bit is set to '1'. A request will be made to fetch the last list element. If the stall/fence bit is active, then the list fetch request is cancelled. However, if the stall/fence is not set, the next list element is fetched. For non-list DMA commands, completion occurs when completion count=0, finish=1, list=0, and stall/fence=0. If start bit=1 for the PU 204 of FIG. 2 at the time of completion, a start command is sent to the SPU 202 of FIG. 2.

If in step 174 it is determined that the current DMA command is not a list element of a list DMA command, the process goes to step 33 to complete the current DMA command after all completions have been received. Subsequently, the process ends.

Subsequently after step 31, it is determined in step 318 whether the current list element is the last list element. If the current list element is the last list element, then the process ends. If on the other hand the current list element is not the last list element, the process goes to step 312 to fetch a next list element and then returns to step 172.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. An apparatus for completing a plurality of (direct memory access) DMA commands in a computer system, the apparatus comprising:
 a processor, the processor comprising:
 means for determining whether the DMA commands are chained together as a list DMA command;
 means for, upon a determination that the DMA commands are chained together as a list DMA command, determining whether a current list element of the list DMA command is fenced; and
 means for, upon a determination that the current list element is not fenced, fetching and processing a next list element before the current list element has been completed.

2. The apparatus of claim 1, further comprising means for, upon a determination that the current list element is fenced, fetching and processing the next list element after the current list element has been completed.

3. The apparatus of claim 1, wherein the computer system includes at least one processor having a local storage, the apparatus further comprising means for generating a table including indications of completion count, list, stall/fence, and finish.

4. The apparatus of claim 3, wherein the completion count is incremented when requests are issued to a bus in the computer system and decremented when the bus completes a request.

5. The apparatus of claim 3, wherein the indication of list comprises one bit, which is set if the DMA commands constitute a list DMA command and reset when a last transfer/unroll of a last DMA command has been issued to a bus of the computer system.

6. The apparatus of claim 3, wherein the indication of stall/fence comprises one bit, which is set if the current list element is fenced and reset when the current list element with fenced/stall condition is acknowledged by the at least one processor.

7. The apparatus of claim 3, wherein the indication of finish comprises one bit, which is set when a last request for a DMA command has been issued and reset when a new command is fetched to a direct memory access controller (DMAC) of the computer system.

8. The apparatus of claim 1, wherein the computer system includes a synergistic processing unit (SPU) and a processing unit (PU), the apparatus further comprising:
 means for generating an SPU table including indications of completion count, list, stall/fence, and finish; and
 means for generating a PU table including indications of completion count, start, and finish.

9. The apparatus of claim 8, wherein the completion count is incremented when requests are issued to a bus in the computer system and decremented when the bus completes a request.

10. The apparatus of claim 8, wherein the indication of list comprises one bit, which is set if the DMA commands constitute a list DMA command and reset when a last transfer/unroll of a last DMA command has been issued to a bus of the computer system.

11. The apparatus of claim 8, wherein the indication of stall/fence comprises one bit, which is set if the current list element is fenced and reset when the current list element with fenced/stall condition is acknowledged by the SPU.

12. The apparatus of claim 8, wherein the indication of start comprises one bit, which is set when a DMA command is fetched to a direct memory access controller (DMAC) of the computer system.

13. The apparatus of claim 8, wherein the indication of finish comprises one bit, which is set when a last request for a DMA command has been issued and reset when a new command is fetched to a direct memory access controller (DMAC) of the computer system.

14. A computer program product for completing a plurality of (direct memory access) DMA commands in a computer system, the computer program product having a non-transitory computer-readable storage medium having a computer program stored thereon, the computer program comprising:
   computer program code for determining whether the DMA commands are chained together as a list DMA command;
   computer program code for, upon a determination that the DMA commands are chained together as a list DMA command, determining whether a current list element of the list DMA command is fenced; and
   computer program code for, upon a determination that the current list element is not fenced, fetching and processing a next list element before the current list element has been completed.

15. The computer program product of claim 14, further comprising computer program code for, upon a determination that the current list element is fenced, fetching and processing the next list element after the current list element has been completed.

16. The computer program product of claim 14, wherein the computer system includes at least one processor having a local storage, the computer program further comprising computer program code for generating a table including indications of completion count, list, stall/fence, and finish.

17. The computer program product of claim 16, wherein the completion count is incremented when requests are issued to a bus in the computer system and decremented when the bus completes a request.

18. The computer program product of claim 16, wherein the indication of list comprises one bit, which is set if the DMA commands constitute a list DMA command and reset when a last transfer/unroll of a last DMA command has been issued to a bus of the computer system.

19. The computer program product of claim 16, wherein the indication of stall/fence comprises one bit, which is set if the current list element is fenced and reset when the current list element with fenced/stall condition is acknowledged by the at least one processor.

20. The computer program product of claim 16, wherein the indication of finish comprises one bit, which is set when a last request for a DMA command has been issued and reset when a new command is fetched to a direct memory access controller (DMAC) of the computer system.

21. The computer program product of claim 14, wherein the computer system includes a synergistic processing unit (SPU) and a processing unit (PU), the computer program further comprising:
   computer program code for generating an SPU table including indications of completion count, list, stall/fence, and finish; and
   computer program code for generating a PU table including indications of completion count, start, and finish.

22. The computer program product of claim 21, wherein the completion count is incremented when requests are issued to a bus in the computer system and decremented when the bus completes a request.

23. The computer program product of claim 21, wherein the indication of list comprises one bit, which is set if the DMA commands constitute a list DMA command and reset when a last transfer/unroll of a last DMA command has been issued to a bus of the computer system.

24. The computer program product of claim 21, wherein the indication of stall/fence comprises one bit, which is set if the current list element is fenced and reset when the current list element with fenced/stall condition is acknowledged by the SPU.

25. The computer program product of claim 21, wherein the indication of start comprises one bit, which is set when a DMA command is fetched to a direct memory access controller (DMAC) of the computer system.

26. The computer program product of claim 21, wherein the indication of finish comprises one bit, which is set when a last request for a DMA command has been issued and reset when a new command is fetched to a direct memory access controller (DMAC) of the computer system.

27. A computer system, comprising:
   at least one processor having a local storage for storing at least one (direct memory access) DMA command as a list element of a list DMA command; and
   a direct memory access controller (DMAC) coupled to the at least one processor for fetching a current list element from the local storage, the DMAC comprising a DMA completion logic (DCL) containing information as to whether the current list element is fenced, the DMAC being configured for fetching and processing a next list element from the local storage before the current list element has been completed when the current list element is not fenced.

28. The computer system of claim 27, wherein the local storage is a level one (L1) cache.

29. The computer system of claim 27, the DMAC further comprising:
   an issue logic configured for issuing a DMA unroll request and coupled to the DCL for receiving a stall notification from the DCL;
   a DMA command queue (DMAQ) configured for temporarily storing the at least one DMA command and coupled to the issue logic for receiving the DMA unroll request; and
   a request interface logic (RIL) coupled to the DMAQ, the issue logic, and the DCL, the RIL being configured for processing at least one segment of the at least one DMA command.

30. The computer system of claim 27, further comprising a bus interface unit (BIU) coupled to the DMAC for receiving at least one segment of the at least one DMA command from the DMAC.

31. The computer system of claim 27, wherein the DCL stores a table including indications of completion count, list, stall/fence, and finish.

32. The computer system of claim 27, further comprising a second processor coupled to the DMAC.

33. The computer system of claim 32, wherein the DCL contains a second table corresponding to the second processor, the second table including indications of completion count, start, and finish.

* * * * *